Patented June 4, 1929.

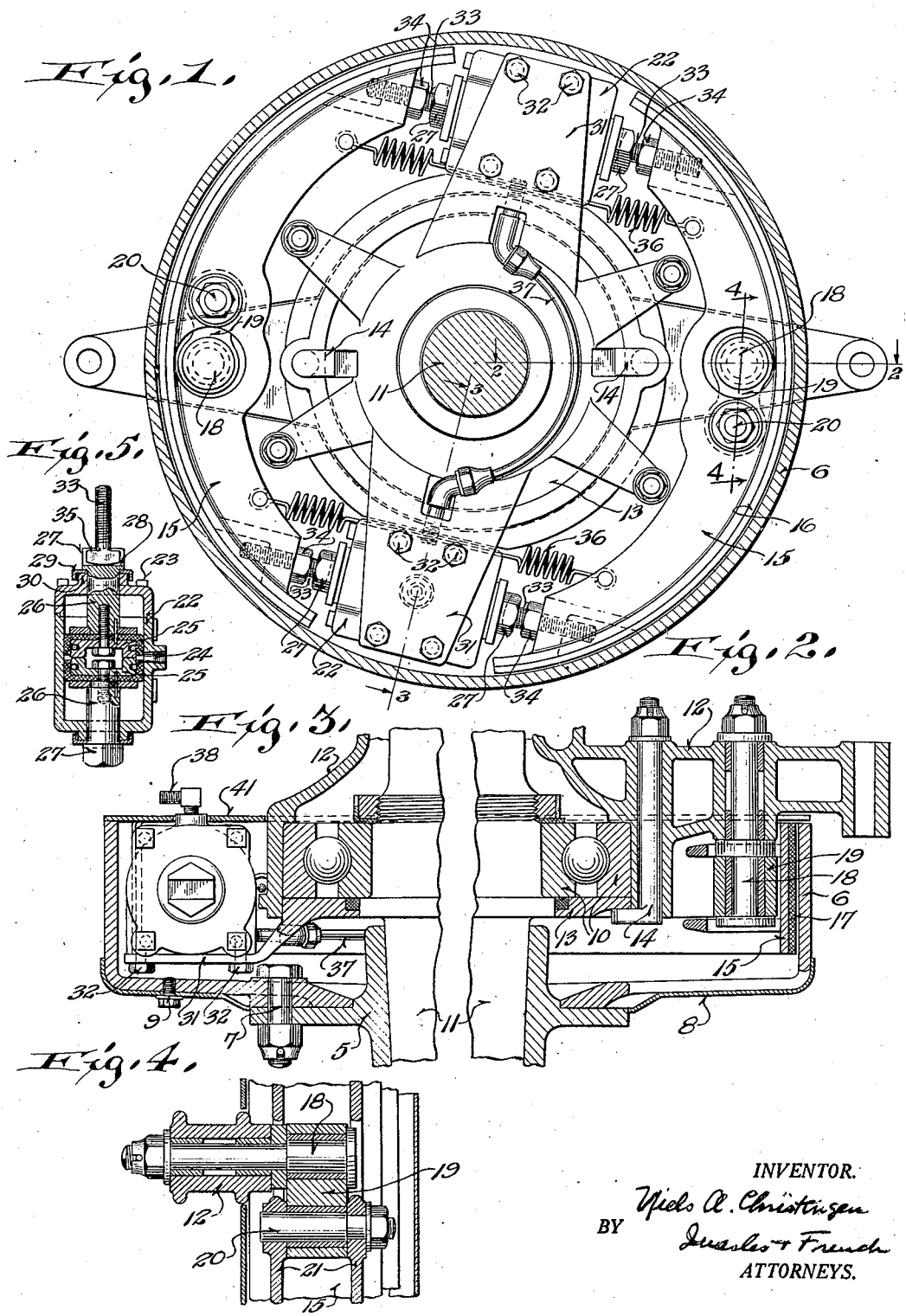

1,715,407

UNITED STATES PATENT OFFICE.

NIELS A. CHRISTENSEN, OF MILWAUKEE, WISCONSIN.

WHEEL BRAKE FOR VEHICLES.

Application filed March 29, 1924. Serial No. 702,866.

The invention relates to vehicle brakes, and more particularly to the brakes for automotive vehicles and trailers for such vehicles.

One object of the invention is to provide a brake mechanism of the brake-shoe type which may be readily manufactured and assembled, and which needs less care in service and keeps its adjustment better than prior brake mechanisms to which my invention relates.

A further object of my invention is to provide a brake mechanism with simple and effective means for adjusting the clearance between said shoes and the brake-drum so that said shoes will be fully released from said drum when the brakes are off but will be close thereto and concentric therewith to provide a quick and efficient setting of the brake when the power is applied.

A further object of my invention is to provide an improved brake mechanism wherein the brake-shoes upon application engage the drum throughout substantially their entire peripheries, thereby securing a substantially uniform pressure throughout the braking area of said shoes and an even distribution of wear on the shoes or the brake-lining usually associated therewith.

A further object of the invention is to provide a brake mechanism in which fluid-pressure-operated motors exert a thrust against the ends of each shoe to move said shoes into braking engagement with the brake-drum.

The invention further consists in the several features hereinafter set forth and more particularly defined by claims at the conclusion hereof.

In the drawings: Fig. 1 is an elevation view, parts being shown in section, of brake mechanism applied to a wheel, parts of the wheel being omitted:

Fig. 2 is a detail sectional view taken on the line 2—2 of Fig. 1;

Fig. 3 is a detail sectional view taken on the line 3—3 of Fig. 1;

Fig. 4 is a detail sectional view taken on the line 4—4 of Fig. 1;

Fig. 5 is a detail sectional view through one of the fluid-pressure-operated motors.

In the drawings the numeral 5 is applied to the hub portion of the vehicle wheel, not shown in detail, and which may be of any suitable construction. The numeral 6 designates a cylindrical brake-drum secured to said wheel in any suitable manner, as by bolts 7, and the numeral 8 designates a cover or dust-plate secured to the drum by bolts 9.

In the particular construction of wheel herein shown, a ball-race 10 for the wheel spindle 11 is secured to the axle housing 12 by a retainer plate 13 and hook bolts 14 mounted in said housing and engaging said plate.

A pair of brake-shoes 15 having their peripheries 16 concentric with the inner cylindrical surface of the drum, and usually provided with a suitable brake-lining 17, are mounted within said drum and adapted to be moved into engagement therewith.

Each shoe is supported preferably at its central portion by a linkage connection with the axle housing. For this purpose an anchor bolt or stud 18 is mounted in the housing 12 and has an anchor-link 19 pivotally mounted thereon at one end and pivotally connected at its other end to a brake-pin 20 mounted on the webs 21 of the brake-shoe. Thus, the shoes are hung at their central portions from the axle housing so that they are free to readily position themselves in a position concentric with the drum and in braking engagement therewith throughout their entire peripheries when braking pressure is applied to their ends.

The means for applying braking pressure to the shoes preferably consist of a pair of fluid-pressure-operated motors, one of which is shown in detail in Fig. 5. Each motor includes a two-part brake-cylinder 22, whose parts are secured together by bolts 23. This cylinder has a central air port 24 for the inlet and exhaust of compressed air and a pair of opposed suitably packed pistons 25 working therein. Each piston has its rod 26 bolted or otherwise suitably secured to its head. Each rod 26 projects from one end of the cylinder and is provided with a polygonal head 27 exterior of the cylinder and provided with a slot 28. The head 27 of each rod is preferably larger in diameter than the main portion thereof and has a flanged washer 29 abutting against it, and said piston is limited in its inward movement by engagement of the inner end of said head or washer with a shoulder 30 formed by the end of the cylinder.

The brake-cylinders are secured to arms 31 on the ball-race retainer plate 13 by means of bolts 32 and the piston rods are directly and adjustably connected with the ends of the brake-shoes adjacent thereto. This connection, in each instance, comprises an adjustable jack-screw 33 having threaded connection or mounted in the end portion of the shoe 15 and locked in adjusted position by a locknut 34. Each jack-screw has a flattened head to form a T-shaped member or tongue 35 fitting into the slot 28 of the adjacent piston rod. As the heads 27 of the piston rods are hexagonal they may each be turned by a wrench so that the jack-screw may be turned to the proper position to provide the desired clearance between the shoe and the drum when in a release position.

The shoes are held in a release position and the jack-screws caused to move the pistons inwardly on the release of pressure by means of springs 36. One of these springs is directly connected at its end to adjacent ends of the shoes 15 and the other is connected in a similar manner to the other adjacent ends of the shoes.

A pipe 37 leading to the central portion of the brake-cylinders connects both of them together to receive air from the pipe 38 connected with the port 40 of one of them, since the port openings for the pipe 37 are in the same plane as the port 40 and consequently both cylinders receive their charge of air at substantially the same time.

A cover-plate 41 may also be provided to fit over the open end of the brake-drum and be secured to one of the non-rotatable parts of the axle housing so as to exclude mud or other foreign matter from the interior of the drums.

No mechanism has been shown for controlling the passage of compressed air to and from the brake-cylinders, as such mechanism is, of course, distinctly separate subject matter from the brake mechanism, though it will be understood that such mechanism includes a valve structure which establishes communication between a supply of compressed air and the brake-cylinders to operate the pistons therein and connects the brake-cylinders with the atmosphere for release of the brake.

It will be noted that the pistons of the motors exert a direct thrust against the brake-shoes; that the shoes may be readily adjusted to maintain their position of full release; that the shoes, when applied, will engage the drum throughout substantially their entire peripheral extent and will center themselves relative to the drum; and that the spring means for releasing the brake are free of the motor and directly connected to the brake-shoes.

The working medium for the fluid-pressure-operated motor is preferably compressed air because of its ease of control, its adaptability for efficient service throughout all seasons of the year in different climates, and its practical efficiency even where small leakage may occur in the motor, though other gases and oil or other liquids may, it is to be understood, be used as a working medium without departing from my invention.

I desire it to be understood that this invention is not to be limited to any particular form or arrangement of parts except in so far as such limitations are specified in the claims or necessitated by the prior art.

What I claim as my invention is:

1. In brake mechanism of the class described, the combination with a brake-drum, of a brake including brake-shoes engageable with said drum, fluid-pressure-operated motors having straight thrust connection with the end portions of each shoe for moving said shoes into braking engagement with said drum, means to release said shoes, and adjustable means determining the release position of said shoes.

2. In brake mechanism of the class described, the combination with a brake-drum, of a brake including a pair of shoes, a support, supporting members for said shoes pivoted to the medial portions of said shoes and to said support, a pair of fluid-pressure-operated motors having their piston rods operatively connected to the end portions of said shoes for forcing said shoes bodily into braking engagement with said drum, and means to release said shoes.

3. In brake mechanism of the class described, the combination with a brake-drum, a pair of medially pivoted and supported brake-shoes, fluid-pressure-operated motors adjacent the adjacent ends of said shoes, each motor having a pair of opposed pistons with the rigid rods thereof in direct straight thrusting engagement with the end portions of the brake-shoes adjacent thereto for bodily moving said shoes into braking engagement with said drum, and means to release said shoes.

4. In brake mechanism of the class described, the combination with a rotatable brake-drum, a non-revoluble support, a pair of brake-shoes, links connected to the medial portions of said shoes and to said support, brake-cylinders mounted on said support, a pair of oppositely moving pistons in each cylinder, the adjacent ends of said shoes being disposed adjacent one of said cylinders and operatively connected to said pistons whereby said shoes are moved bodily into engagement with said drum on the outward movement of said piston, and means to release said shoes.

5. In brake mechanism of the class described, the combination with a rotatable brake-drum, an axle housing, a bearing for the wheel spindle mounted in said housing, of a detachable retainer plate for said bearing, a brake, a fluid-pressure-operated means carried by said retainer plate and for moving said brake into engagement with said drum, and means to release said brake.

In testimony whereof I affix my signature.

NIELS A. CHRISTENSEN.